United States Patent
Honda et al.

(10) Patent No.: US 11,753,513 B2
(45) Date of Patent: Sep. 12, 2023

(54) POLYOLEFIN RESIN FOAM AND PRODUCTION METHOD THEREOF AND ADHESIVE TAPE

(71) Applicant: TORAY INDUSTRIES, INC., Tokyo (JP)

(72) Inventors: Taiyo Honda, Otsu (JP); Yusuke Kojima, Tokyo (JP); Tadafumi Akiyama, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 405 days.

(21) Appl. No.: 16/648,589

(22) PCT Filed: Oct. 3, 2018

(86) PCT No.: PCT/JP2018/037006
§ 371 (c)(1),
(2) Date: Mar. 18, 2020

(87) PCT Pub. No.: WO2019/073873
PCT Pub. Date: Apr. 18, 2019

(65) Prior Publication Data
US 2020/0239657 A1    Jul. 30, 2020

(30) Foreign Application Priority Data

Oct. 11, 2017  (JP) ................. 2017-197413

(51) Int. Cl.
| | | |
|---|---|---|
| C08J 9/00 | (2006.01) | |
| C08J 5/18 | (2006.01) | |
| C08J 9/228 | (2006.01) | |
| C09J 123/06 | (2006.01) | |
| C09J 123/12 | (2006.01) | |
| C09J 201/00 | (2006.01) | |

(52) U.S. Cl.
CPC ............... *C08J 9/0061* (2013.01); *C08J 5/18* (2013.01); *C08J 9/228* (2013.01); *C09J 123/06* (2013.01); *C09J 123/12* (2013.01); *C09J 201/00* (2013.01); *C08J 2323/06* (2013.01); *C08J 2323/12* (2013.01); *C09J 2203/00* (2013.01)

(58) Field of Classification Search
CPC ..................................... C08J 9/0061
See application file for complete search history.

(56) References Cited

U.S. PATENT DOCUMENTS 11,236,211 B2 * 2/2022 Honda .............. C08J 9/10
2017/0282430 A1 * 10/2017 Baldwin ............ C08J 9/103

FOREIGN PATENT DOCUMENTS

| JP | 62164514 | * | 7/1987 |
| JP | 2003-313344 A | | 11/2003 |
| JP | 2015-187232 A | | 10/2015 |
| JP | 2015-199925 A | | 11/2015 |
| JP | 2016155344 | * | 9/2016 |
| JP | 2016-186030 A | | 10/2016 |
| JP | 2017-190375 A | | 10/2017 |
| WO | WO 2018/163612 A1 | | 9/2018 |

OTHER PUBLICATIONS

International Search Report, issued in PCT/JP2018/037006, PCT/ISA/210, dated Jan. 15, 2019.
Written Opinion of the International Searching Authority, issued in PCT/JP2018/037006, PCT/ISA/237, dated Jan. 15, 2019.

* cited by examiner

*Primary Examiner* — Irina Krylova
(74) *Attorney, Agent, or Firm* — Birch, Stewart, Kolasch & Birch, LLP

(57) ABSTRACT

One object of the present invention is to provide a polyolefin resin foam sheet suitable as a sealing substrate having both flexibility and heat resistance despite its thinness, and an adhesive tape in which the polyolefin resin foam sheet is used. In order to achieve this, the polyolefin resin foam includes a thermoplastic elastomer, wherein the endothermic peaks measured by a differential scanning calorimeter (DSC) occur in the range of at least 110° C. or more and 143° C. or less and at 153° C. or more, and the thermoplastic elastomer resin is contained at a ratio of 30% by mass or more and 60% by mass or less in 100% by mass of the polyolefin resin.

6 Claims, No Drawings

POLYOLEFIN RESIN FOAM AND PRODUCTION METHOD THEREOF AND ADHESIVE TAPE

TECHNICAL FIELD

The present invention relates to a polyolefin resin foam sheet and an adhesive tape in which the polyolefin resin foam sheet is used.

BACKGROUND ART

Conventionally, polyolefin resin foams have uniform and fine closed cells, are lightweight and show excellent heat insulation, cushioning, and processability. By virtue of these characteristics, the polyolefin resin foams are used as cushioning materials during transportation, heat insulating materials, packaging materials and building materials. Due to their excellent heat resistance and processability, the polyolefin resin foams are also used widely for automobile structural members as a laminated body. An adhesive tape material obtained by applying an adhesive on one surface or both surfaces of a polyolefin resin foam is also used as a protective sheet material and a cushioning material for an electronic device. As a substrate of this kind of adhesive tapes or sheets, a sheet of a synthetic resin foam which is relatively flexible is used. In particular, a foam sheet obtained by foaming a polyolefin resin such as polyethylene, polypropylene, or the like is generally used.

In recent years, there has been a demand for improved heat resistance of foams and improved usage environment for several reasons: in response to rapid progress of global warming phenomenon and heat generation of equipment after a long-term use of electronic devices; for seal fixing materials such as automotive interior materials used under a high temperature environment; and the like.

In Patent Document 1, a mixture of polylactic acid, a polyolefin resin and a polyolefin resin copolymer is used as a resin for forming a foam member, but the use of polylactic acid causes a problem of heat resistance and time-based deterioration. In addition, a foam in which synthetic rubber or natural rubber such as polyethylene, polyurethane rubber, ethylene-propylene-diene copolymer rubber (EPDM), ethylene-propylene copolymer rubber (EPR), chloroprene rubber, or the like, is used as a resin which forms a foam member is flexible but has a problem of heat resistance.

Patent Document 2 discloses a foam having good heat insulation and flexibility. However, since a polyethylene resin is used as a resin forming the foam member, the foam itself does not have heat resistance as in the above and thus results in a problem of softened foam and breakage of cells in a high temperature environment, specifically, in an environment of 100° C. or more.

Patent Document 3 proposes a polypropylene resin foam for electronic/electric equipment, which is obtained by subjecting a polyolefin resin foam to slicing and which can prevent intrusion of water, dust, and the like. However, the open cell foam has a problem as a waterproof sealing substrate because water passes easily through the foam in which the cells communicate with each other.

PRIOR ART DOCUMENTS

Patent Documents

Patent Document 1: WO2006/103969 pamphlet
Patent Document 2: JP2017-66403 A
Patent Document 3: JP2016-108422 A

SUMMARY OF THE INVENTION

Problems to be Solved by the Invention

One object of the present invention is to provide a polyolefin resin foam which is waterproof and excellent in flexibility, cushioning and heat resistance despite its thinness, and can be used suitably as a variety of sealing substrates in the fields of architecture, electricity, electronics, vehicles, and the like; a method of producing the polyolefin resin foam; and an adhesive tape in which the polyolefin resin foam sheet is used.

Solutions to the Problems

After intensive studies to solve the above problems, the inventors have found that a foam described as below can overcome the above problems.

That is, a polyolefin resin foam comprises a polyolefin resin and a thermoplastic elastomer, wherein the endothermic peaks measured by a differential scanning calorimeter (DSC) occur in the range of at least 110° C. or more and 143° C. or less and at 153° C. or more, and the thermoplastic elastomer resin is contained at a ratio of 30% by mass or more and 60% by mass or less in 100% by mass of the resins constituting the foam.

In addition, for a foam, preferably a sheet-shaped foam of the present invention, a polyolefin resin foam sheet has a surface roughness Sa (arithmetic mean height) on both the front and back surfaces of 5 μm or more and 80 μm or less, and the difference in surface roughness Sa determined by the following formula is 20 μm or more.

Difference in surface roughness $Sa$ on both the front and back surfaces=Surface roughness $Sa$ on the surface $B$−Surface roughness $Sa$ on the surface $A$.

As a preferred method of producing a foam sheet of the present invention, the method of producing a polyolefin resin foam sheet comprises the steps of foaming a resin composition comprising at least a polyolefin resin and a thermoplastic elastomer to produce a foam sheet; and slicing the foam sheet in parallel to the MD-TD plane to produce a foam sheet.

Preferred aspects of the above-described invention are also included.

Effects of the Invention

Despite its thinness, the polyolefin foam of the present invention is waterproof and excellent in flexibility, cushioning, and heat resistance. Thus, the polyolefin foam of the present invention can be suitably used as a variety of sealing substrates.

Embodiments of the Invention

The present invention will be described below in detail.

In the present invention, "MD" stands for Machine Direction and refers to a direction corresponding to the direction of the resin extrusion or the like (length of a long sheet) when a polyolefin resin foam sheet is produced. "TD" stands for Transverse Direction and refers to a direction which is perpendicular to the MD and parallel to the foam sheet (width direction). "ZD" means Thickness Direction and refers to a direction perpendicular to both the MD and TD (thickness direction).

The polyolefin resin foam according to the present invention comprises a thermoplastic elastomer, and the endothermic peaks due to melting measured by a differential scanning calorimeter (DSC) occur in the range of 110° C. or more and 143° C. or less and at 153° C. or more. The latter endothermic peak preferably occurs in the range of 153° C. or more and 170° C. or less. When the endothermic peaks due to melting are lower than 110° C., the polyolefin resin foam easily softens, and cells easily break (hereinafter referred to as "cell break") due to melting of the resin, and the reduction in the thickness direction of a sealing material (thermal dimensional change) increases, resulting in a problem of reduced waterproof property. The endothermic peaks due to melting occur preferably in the range of 120° C. or more and 140° C. or less for at least one peak, and at 153° C. or more for at least one another peak because in these ranges, the heat resistance is good as a sealing substrate used in a high temperature environment of 100° C. or more. The endothermic peaks occurring in two temperature ranges result in different temperatures for the softening points of the polyolefin resin foam. Thus, the flexibility gradually changes in a high temperature environment of 100° C. or more and therefore, such a polyolefin resin foam is suitable for use as a sealing material in a high temperature environment. In addition, the use in an environment that requires heat resistance of 130° C. or more is also considered. Therefore, there is preferably an endothermic peak occurring at 155° C. or more. The endothermic peak refers to the summit of the endothermic peak observed in the measurement with a differential scanning calorimeter (DSC).

As a simple method of having endothermic peaks due to melting measured by a differential scanning calorimeter (DSC) in two or more temperature ranges, for example, the polyolefin resin foam of the present invention comprises at least one kind of polyolefin resins such as a polypropylene resin or a polyethylene resin having a melting point in the temperature range of 110° C. or more and 143° C. or less; and a thermoplastic elastomer resin or a polypropylene resin if necessary having a melting point in the temperature range of 153° C. or more and 170° C. or less.

In each temperature range (the temperature range of 110° C. or more and 143° C. or less, or the temperature range of 153° C. or more and 170° C. or less), several kinds of resins having a melting point in the temperature ranges may be used.

For example, a polypropylene resin having a melting point in the range of 110° C. or more and 143° C. or less and a thermoplastic elastomer resin having a melting point in the range of 153° C. or more and 170° C. or less are mixed, or a thermoplastic elastomer resin and a polypropylene resin having a melting point in the range of 153° C. or more and 170° C. or less and a polyethylene resin having a melting point in the range of 110° C. or more and 143° C. or less are mixed.

The thermoplastic elastomer used in the present invention has a soft segment (a polymer having elasticity) and a hard segment (a polymer having plasticity) in its molecular structure. If necessary, a copolymer of an ethylene monomer and a propylene monomer with another copolymerizable monomer can be also used. Further, two or more kinds of a polymer which becomes a hard segment and a polymer which becomes a soft segment can be physically mixed to obtain a thermoplastic elastomer as a polymer alloy. In the present invention, conventionally known thermoplastic elastomers can be used. At least one kind of these thermoplastic elastomer resins may be used, or two or more kinds may be blended. Further, there is no particular limitation on the polymerization method of these thermoplastic elastomer resins, and examples thereof include high pressure polymerization, slurry polymerization, solution polymerization and gas phase polymerization. The polymerization catalysts are also not particularly limited, and examples thereof include Ziegler catalysts, metallocene catalysts and the like.

Preferred examples of the thermoplastic elastomer resin used in the present invention include polystyrene-based thermoplastic elastomers (SBC, TPS), polyolefin-based thermoplastic elastomers (TPO), vinyl chloride-based thermoplastic elastomers (TPVC), polyurethane-based thermoplastic elastomers (TPU), polyester-based thermoplastic elastomers (TPEE, TPC), polyamide-based thermoplastic elastomers (TPAE, TPA), polybutadiene-based thermoplastic elastomers (RB), hydrogenated styrene butadiene rubber (HSBR), styrene-ethylene butylene-olefin crystalline block polymers (SEBC), olefin crystalline-ethylene butylene-olefin crystalline block polymers (CEBC), styrene-ethylene butylene-styrene block polymers (SEBS), block copolymers such as olefin block copolymers (OBC) and the like, and graft copolymers such as polyolefin-vinyl graft copolymers, polyolefin-amide graft copolymers, alpha-olefin copolymers, polyolefin-acrylic graft copolymers, polyolefin-cyclodextrin graft copolymers, and the like. Olefin block copolymers (OBC) or polyolefin-based thermoplastic elastomers (TPO) are particularly preferred. It is preferred that the heat resistance and the flexibility are high. From this viewpoint, olefin block copolymers (OBC) are particularly preferred.

From the viewpoint of the excellent heat resistance, the above-described thermoplastic elastomer resin has preferably a melting point in the range of 150° C. or more and 170° C. or less, and preferably a crystal melting energy of 5 J/g or more and 30 J/g or less. When the melting point is less than 150° C. and the crystal melting energy exceeds 30 J/g, the crystallinity increases, and thus sufficient heat resistance and flexibility may not be obtained. More preferably, the melting point is 153° C. or more, and the crystal melting energy is 10 J/g or more and 25 J/g or less.

The above-described thermoplastic elastomer resin has preferably a crystallization temperature of 50° C. or more and 150° C. or less, a density of 850 kg/m$^3$ or more and 920 kg/m$^3$ or less, and an MFR (230° C.) of 1 g/10 minutes or more and 15 g/10 minutes or less. Especially, those having a crystallization temperature of 60° C. or more and 140° C. or less, a density of 860 kg/m$^3$ or more and 910 kg/m$^3$ or less, and an MFR (230° C.) of 3 g/10 minutes or more and 10 g/10 minutes or less are particularly preferably used because the molten state, kneading property and processability as in foaming moldability at the time of sheet formation are good.

Examples of the commercially available thermoplastic elastomer resins which can be used in the present invention include "Tafmer" (registered trademark) PN-3560 and "NOTIO" (registered trademark) SN-0285, which are manufactured by Mitsui Chemicals, Inc., for an olefin block copolymer (OBC), and "Prime TPO" (registered trademark) M142E and "Qualia" (registered trademark) CS356M, which are manufactured by Prime Polymer Co., Ltd., for a polyolefin-based thermoplastic elastomer (TPO), and the like.

The polyolefin resin foam of the present invention comprises a polyolefin resin and a thermoplastic elastomer. As a polyolefin resin contained other than the thermoplastic elastomer, a polypropylene resin and a polyethylene resin are preferably used, and in order to achieve both heat resistance and flexibility, a polypropylene resin is more preferably used. Preferred examples of the polypropylene resins used for the foam of the present invention include homopolypropylene, ethylene-propylene random copolymers, ethylene-propylene block copolymers and the like. As necessary, copolymers of a propylene monomer with another copolymerizable monomer can be also used. One kind of the polypropylene resins may be used alone, or two or more kinds may be used in combination. Any conventionally known polypropylene resin can be used.

There is no particular limitation on the polymerization method of these polypropylene resins, and examples thereof include high pressure polymerization, slurry polymerization, solution polymerization and gas phase polymerization. The polymerization catalysts are also not particularly limited, and examples thereof include Ziegler catalysts, metallocene catalysts and the like.

As the above-mentioned polypropylene resin, an ethylene-propylene random copolymer and an ethylene-propylene random block copolymer having a melting point of 135° C. or more and 160° C. or less and an MFR (230° C.) of 0.5 g/10 min or more and 5.0 g/10 min or less, in which the ethylene content in 100% by mass of the polypropylene resin is 1% by mass or more and 15% by mass or less, or an ethylene-propylene block copolymer or homopolypropylene having a melting point of 150° C. or more and 170° C. or less and an MFR (230° C.) of 1.0 g/10 min or more and 7.0 g/10 min or less, in which the ethylene content is 1% by mass or more and 15% by mass or less, are particularly preferably used. The term "block" of ethylene-propylene random-block copolymers and ethylene-propylene block copolymers means that ethylene-propylene random copolymers and homo-polypropylene are mixed with ethylene-propylene rubber, and this is different from the block structure generally described in polymer chemistry.

The foam of the present invention may contain a polyethylene resin. Examples of the polyethylene resins include high density polyethylene (HDPE), low density polyethylene (LDPE), linear low density polyethylene (LLDPE), ethylene-ethyl acrylate copolymers (EEA), ethylene-butyl acrylate copolymers (EBA), and the like. As necessary, copolymers of an ethylene monomer with other copolymerizable monomers can also be used. One kind of the polyethylene resins may be used alone, or two or more kinds may be used in combination. There is no particular limitation on the polymerization method of these polypropylene resins, and examples thereof include high pressure polymerization, slurry polymerization, solution polymerization and gas phase polymerization. The polymerization catalysts are also not particularly limited, and examples thereof include Ziegler catalysts, metallocene catalysts and the like.

The polyethylene resin preferably used has a density of 890 kg/m$^3$ or more and 950 kg/m$^3$ or less and an MFR (190° C.) in the range of 1 g/10 min or more and 15 g/10 min or less. Especially, an ethylene-α-olefin copolymer having a density of 920 kg/m$^3$ or more and 940 kg/m$^3$ or less, an MFR (190° C.) of 2 g/10 min or more and 10 g/10 min or less, and a melting point of 100° C. or more and 130° C. or less is particularly preferably used.

The polyolefin resin foam of the present invention comprises a thermoplastic elastomer at a ratio of 30% by mass or more and 60% by mass or less in 100% by mass of the resins constituting the foam. The thermoplastic elastomer resin is preferably contained at a ratio of 35% by mass or more and 55% by mass or less in order to improve flexibility and cushioning. If the ratio of the thermoplastic elastomer resin is less than 30% by mass, excellent flexibility and cushioning cannot be obtained, and when compressed as a sealing material, a gap with the substrate is generated, resulting in a problem of reduced waterproof property. If the ratio of the thermoplastic elastomer resin is more than 60% by mass, flexibility is improved, but when compressed as a sealing material, appropriate repulsion is not obtained, and cells are crushed, resulting in reduced heat insulation and heat resistance as well as appearance defects such as wrinkles. Furthermore, there is also a problem that the tackiness (adhesiveness) of the sheet surface is improved, and dirt and the like are easily attached.

The polyolefin resin foam of the present invention preferably comprises a polypropylene resin at a ratio of 10% by mass or more and 70% by mass or less in 100% by mass of the resins constituting the foam because both heat resistance and flexibility are facilitated. When the ratio of the polypropylene resin is less than 10% by mass, the heat resistance as a sealing material used in a high temperature environment of 100° C. or more may be reduced.

In the polyolefin resin foam of the present invention, an antioxidant such as a phenolic antioxidant, a phosphorus antioxidant, an amine antioxidant, a sulfur antioxidant or the like, a metal deactivator, a filler such as mica, talc or the like, a flame retardant such as bromine flame retardant, phosphorus flame retardant or the like, a flame retardant auxiliary agent such as antimony trioxide or the like, an anti-electrification agent, a lubricant, a pigment, and an additive such as polytetrafluoroethylene or the like may be added as long as the effects of the present invention are not impaired.

The polyolefin resin foam of the present invention may be colored black. Examples of black colorants used for coloring in black include carbon black (furnace black, channel black, acetylene black, thermal black, lamp black, and the like), graphite, copper oxide, manganese dioxide, aniline black, perylene black, titanium black, cyanine black, activated carbon, ferrite (nonmagnetic ferrite, magnetic ferrite, and the like), magnetite, chromium oxide, iron oxide, molybdenum disulfide, chromium complex, complex oxide black pigment, anthraquinone organic black pigment, and the like, and any known colorant can be used. Among them, carbon black is preferred from the viewpoint of cost and availability.

One kind of the black colorants can be used alone, or two or more kinds can be used in combination. The amount of the black colorant to be used is not particularly limited, and the amount can be adjusted suitably so that desired optical characteristics can be obtained on a double-sided adhesive sheet of the present invention.

The polyolefin resin foam of the present invention may be preferably sheet-shaped.

In the polyolefin resin foam sheet of the present invention, both the front and back surfaces refer to surfaces perpendicular or substantially perpendicular to the ZD direction in the foam sheet (in other words, surfaces along both the MD direction and the TD direction). The surface A and the surface B are terms of convenience, and a surface having a larger Sa in terms of the surface roughness Sa or a surface having a larger average cell size in terms of the average cell size described later is referred to as surface B, and the other surface is referred to as surface A (same hereinafter. Note that the surface A determined from the surface roughness Sa and the surface A determined from the average cell size are not necessarily the same surface.) The surface roughness Sa (arithmetic mean height) on both the front and back surfaces is preferably 5 μm or more and 80 μm or less, more preferably 10 μm or more and 70 μm or less. When the above-mentioned surface roughness Sa exceeds 80 μm, the surface smoothness is reduced, and in the case of use as an adhesive tape, the application amount of the adhesive is increased, which may increase the production cost. When the above-mentioned surface roughness Sa (arithmetic mean height) is less than 5 μm, the surface smoothness is high, and the surface may be peeled off from the adhesive at the interface.

In the above-described polyolefin resin foam sheet, the difference in surface roughness Sa between both the front and back surfaces is preferably 20 μm or more. When the difference in surface roughness Sa is less than 20 μm, in the case of use as an adhesive tape in which an adhesive layer is provided on one surface A in the ZD direction (thickness), the cushioning property on the other surface B may be impaired due to the small difference between front and back surfaces. The upper limit is desirably 75 μm or less. In order to achieve compatible adhesive layer and cushion layer as an adhesive tape substrate, the difference in the surface roughness Sa between both the front and back surfaces is more preferably 25 μm or more and 50 μm or less.

The difference in the surface roughness Sa is determined by the following formula.

Difference in surface roughness $Sa$ between both the front and back surfaces=Surface roughness $Sa$ on the surface $B$−Surface roughness $Sa$ on the surface $A$.

The surface roughness Sa (arithmetic mean height) is a so-called three-dimensional arithmetic mean roughness Sa, which is a three-dimensional extension of the two-dimensional surface roughness Ra, and obtained by dividing the volume enclosed by the curved plane of the surface shape and the mean plane by the measured area.

The surface roughness Sa (arithmetic mean height) can be measured using a surface texture measuring apparatus in accordance with commercially available three-dimensional surface texture parameters: ISO 25178. For example, VHX series (manufactured by Keyence Corporation), LEXT ORS series (manufactured by Olympus Corporation), Surftest SV series (manufactured by Mitutoyo Corporation) and the like can be used.

In the polyolefin resin foam sheet of the present invention, the average cell size in the MD direction is preferably 100 μm or more, and more preferably 120 μm or more. The upper limit thereof is preferably 550 μm or less, and more preferably 400 μm or less. If the average cell size in the MD direction is less than 100 μm, the density of the foam increases, and the flexibility as a foam may be impaired. The average cell size in the MD direction of 100 μm or more is suitable for maintaining the flexibility as an adhesive tape substrate and for mass production without causing appearance defects.

If the average cell size in the MD direction exceeds 550 μm, the density of the foam decreases, and although the flexibility improves, the strength as a foam may be impaired. In addition, increased average cell size in the MD direction results in deterioration of the surface roughness of the polyolefin resin foam, and when the adhesive is applied, the amount of the adhesive to be applied may increase, which is disadvantageous in terms of cost. In the above-described polyolefin resin foam, the ratio of the average cell size in the MD direction on the surface B to the average cell size in the MD direction on the surface A is preferably 1.2 or more, and more preferably 1.3 or more. The upper limit thereof is preferably 1.8 or less, and more preferably 1.6 or less.

When the ratio of the average cell size in the MD direction on the surface B to the average cell size in the MD direction on the surface A is less than 1.2, in the case of use as an adhesive tape in which an adhesive layer is provided on the surface A, the cushioning property on the other surface B may be impaired due to the lack of difference between front and back surfaces.

When the ratio of the average cell size in the MD direction on the surface B to the average cell size in the MD direction on the surface A exceeds 1.8, the difference in the application amount of the adhesive and the peeling strength increases due to the difference between the front and back surfaces, and the available range as an adhesive tape may be limited.

The ratio of the average cell size in the MD direction is determined by the following formula.

Ratio of average cell size in the $MD$ direction=Average cell size in the $MD$ direction on the surface $B$/Average cell size in the $MD$ direction on the surface $A$.

In the polyolefin resin foam sheet of the present invention, the gel fraction is preferably 20% or more and 60% or less, and more preferably 30% or more and 50% or less. When the gel fraction is less than 20%, the heat resistance decreases, likely causing cell break. Thus, the cell size tends to be coarse, and the waterproof property as a sealing material tends to decrease. The gel fraction exceeding 60% may result in finer cells and the decrease in the apparent density. From the viewpoint of improved processability and heat resistance, the gel fraction is preferably 30% or more and 50% or less.

The apparent density of the above-described polyolefin resin foam sheet is preferably 50 kg/m$^3$ or more and 165 kg/m$^3$ or less, and more preferably 70 kg/m$^3$ or more and 125 kg/m$^3$ or less. When the apparent density exceeds 165 kg/m$^3$, the cushioning property and flexibility may decrease. When the apparent density is less than 50 kg/m$^3$, the polyolefin resin foam sheet is soft and the mechanical properties (tensile strength, tensile elongation) may decrease.

In the above-described polyolefin resin foam sheet, the thickness is preferably 0.6 mm or more and 1.4 mm or less, more preferably 0.7 mm or more and 1.2 mm or less. When the thickness is less than 0.6 mm, the cushioning property as an adhesive tape substrate and a sealing material may deteriorate. When the thickness is more than 1.4 mm, the polyolefin resin foam sheet may not be sandwiched between electronic and electric devices which are becoming thinner and thinner.

In the above-described polyolefin resin foam sheet, the 25% compression hardness is preferably 180 kPa or less, and more preferably 80 kPa or less. The compression hardness of 80 kPa or less improves the flexibility and conformability to the machine during slicing. On the other hand, the compression hardness exceeding 180 kPa results in the decrease in the flexibility and deteriorated conformability to the substrate irregularities, which may cause swelling due to the space generated between the polyolefin resin foam and the substrate. The 25% compression hardness of the polyolefin foam substrate is measured according to JIS K6767.

The tensile strength in the MD direction and in the TD direction of the above-described polyolefin resin foam sheet (tensile strength) is not particularly limited, but is preferably 200 kPa or more and 5000 kPa or less. When the tensile strength is less than 200 kPa, the strength as a sealing material is low, and the foam may be easily broken. Thus, sufficient characteristics for use as a sealing material may not be obtained. The tensile strength exceeding 5000 kPa may result in the interfacial separation from the adhesive layer without the material failure of the foam. The tensile strength is more preferably 500 kPa or more and 4000 kPa because the foam used as the sealing material undergoes the material failure, and thus the adhesive strength can be maximized. The tensile strength of the above-described polyolefin foam substrate (tensile strength in the longitudinal direction and the tensile strength in the width direction) is measured according to MS K6767.

The polyolefin resin foam sheet of the present invention may be surface-treated on one surface or on both surfaces. For example, chemical or physical surface treatments such as undercoating treatment, corona discharge treatment, plasma treatment and the like may be applied. More specifically, in order to enhance the adhesion property to an acrylic adhesive layer or the like, a conventional surface treatment, for example, an oxidation treatment by a chemical or physical method such as a corona discharge treatment, a chromic acid treatment, an ozone exposure, a flame exposure, a high-pressure bombardment exposure, an ionizing radiation treatment, or the like may be applied. A coating treatment by an undercoating agent, a release agent, or the like may be also applied. The corona discharge treatment is preferred because the corona discharge treatment does not change the surface smoothness of the polyolefin resin foam.

An adhesive tape can be produced by laminating an adhesive layer on one surface or both the front and back surfaces of the above-described polyolefin resin foam. The adhesive is not particularly limited, and examples thereof include acrylic adhesives, rubber adhesives (natural rubber adhesives, synthetic rubber adhesives, and the like), silicone adhesives, polyester adhesives, urethane adhesives, polyamide adhesives, epoxy adhesives, vinyl alkyl ether adhesives, fluorine adhesives and the like. The above adhesive can be used alone or in combination of two or more kinds. The above adhesive may be any agent form such as an emulsion adhesive, a solvent adhesive, a hot-melt adhesive, an oligomer adhesive, a solid adhesive or the like.

The thickness of the above-described adhesive layer is not specifically limited, and is preferably 5 μm or more and 100 μm or less, and more preferably, 20 μm or more and 80 μm or less. As the adhesive layer, a thinner layer is preferred because the preventive effect of the adhesion of dust and dirt at an end portion is better. The adhesive layer may be a single layer or a laminate. When forming an adhesive tape, the surface to which the adhesive is applied is not particularly limited, but the adhesive is preferably applied to the surface having a smaller average cell size, considering the usability of the adhesive tape.

The method of producing the foam of the present invention will be described below as an example.

The polyolefin resin foam sheet of the present invention includes the step of producing a polyolefin resin foam; and the step of slicing the polyolefin resin foam in a plane direction which is parallel to the MD-TD plane to produce a polyolefin resin foam sheet. Further preferably, the steps of heating and compressing the polyolefin resin foam sheet subjected to the above-described slicing can also be included, and thus heated pseudo skin surfaces can be formed on the top and bottom surfaces in the ZD direction. The foam may preferably have skin surfaces on both the top and bottom surfaces in the ZD direction of the foam.

First, the step of producing a polyolefin resin foam will be described.

The polyolefin resin foam can be produced by mixing a blowing agent capable of generating gas in a mixture of a polyolefin resin and a thermoplastic elastomer. Examples of the production method include: an atmospheric pressure foaming method in which a chemical blowing agent by thermal decomposition is added as a blowing agent to a mixture of a polyolefin resin and a thermoplastic elastomer, and the resulting mixture is melt-kneaded and then foamed by heating under atmospheric pressure; an extrusion foaming method in which a chemical blowing agent by thermal decomposition is thermally decomposed in an extruder and the mixture of a polyolefin resin and a thermoplastic elastomer is foamed while being extruded under high pressure; a press foaming method in which chemical blowing agent by thermal decomposition is thermally decomposed in a press mold and the mixture of a polyolefin resin and a thermoplastic elastomer is foamed under reduced pressure; an extrusion foaming method in which a solvent which becomes gas or vaporizes is melt-kneaded in an extruder and the mixture of a polyolefin resin and a thermoplastic elastomer is foamed by extrusion under high pressure. The foam can be preferably produced by stretching as well. For example, a polyolefin resin foam sheet is heated to 200° C. or more, stretched by 2 times or more and 4.5 times or less in the MD direction, and foamed by 1.5 times or more and 3.5 times or less in the TD direction. As a result, the surface roughness Sa can be controlled to be 5 μm or more and 80 μm or less, leading to a relatively smooth surface, and the average cell size in the MD direction can be controlled to be 100 μm or more and 550 μm or less.

In addition, the position of the appearance of endothermic peaks within the ranges of the present invention can be adjusted by, for example, selection of a resin type to be used (such as a polyolefin resin and a thermoplastic elastomer), selection of an additive type to be added as necessary, and selection of cross-linking conditions in the case of cross-linking which will be described later. The adjustment is easy when the polyolefin resin and/or the thermoplastic elastomer preferably described above are used.

The chemical blowing agent by thermal decomposition used herein is a chemical blowing agent which decomposes on heating to release a gas, and, examples thereof include organic blowing agents such as azodicarbonamide, N,N'-dinitrosopentamethylenetetramine, P,P'-oxybenzenesulfonyl hydrazide and the like, and inorganic blowing agents such as sodium bicarbonate, ammonium carbonate, ammonium bicarbonate and calcium azide and the like.

The blowing agent can be used alone or in combination of two or more kinds. In order to obtain a flexible foam sheet having high moldability, a smooth surface and a high ratio, an atmospheric pressure foaming method in which azodicarbonamide is used as a blowing agent is suitably applied.

The method of cross-linking a polyolefin resin foam used in the present invention is not particularly limited. Examples of the methods of obtaining a cross-linked foam sheet include a chemical cross-linking method in which cross-linking is performed chemically by a cross-linking agent which has a chemical structure such as a silane group, a peroxide, a hydroxyl group, an amide group, an ester group or the like and which is contained in raw materials; and a radiation cross-linking method in which cross-linking is performed by irradiation of an electron beam, an α ray, a β ray, a γ ray, and an ultraviolet ray on the polyolefin resin.

The method of adjusting the gel fraction of the polyolefin resin foam of the present invention to 20% or more and 60% or less is not particularly limited. The gel fraction can be controlled to a target range by, for example, irradiating an electron beam and adjusting the average absorption dose to 0.1 to 20 Mrad under conditions of irradiation voltage of 400 to 1200 kV, irradiation current of 1 to 60 mA, and running speed of 1 to 30 m/min. Furthermore, the gel fraction can be also adjusted by increasing or decreasing the amount of the cross-linking agent added.

An electron beam cross-linking method using an electron beam capable of generating a difference (distribution) in the gel fraction in the thickness direction of the foam is suitably used so that the average cell size in the MD direction on both the front and back surfaces will be 100 μm or more and 550 μm or less, and the ratio of the average cell size in the MD direction on the surface B to the average cell size in the MD direction on the surface A will be 1.2 or more and 1.8 or less. Due to the difference in the gel fraction, a density difference is generated in the thickness direction of the foam, and the cell size can be adjusted.

There is no particular limitation on the method of generating the difference in gel fraction in the polyolefin resin foam. For example, an electron beam with an irradiation voltage of 400 to 1200 kV is used to the polyolefin resin foam or a sheet before foaming, in which the gel fraction difference in the thickness direction is controlled by adjusting the amount of electron beam transmission from one surface with a weak irradiation voltage of about 400 to 650 kV, by shielding the electron beam irradiation with a titanium plate or the like, or by irradiating energy with different irradiation voltages from both surfaces, and the like.

In the polyolefin resin foam used in the present invention, when the construction of a cross-linked structure by electron beam cross-linking is difficult, a cross-linking auxiliary agent may be contained in raw materials for producing the polyolefin resin foam. Thus, a cross-linked foam sheet can be obtained by an electron beam. The cross-linking auxiliary agent is not particularly limited, but a polyfunctional monomer is preferably used. Examples of polyfunctional monomers which can be used include divinylbenzene, trimethylolpropane trimethacrylate, 1,6-hexanediol dimethacrylate, 1,9-nonanediol dimethacrylate, 1,10-decanediol dimethacrylate, trimellitic acid triallyl ester, triallyl isocyanurate, ethyl vinyl benzene and the like. These polyfunctional monomers may be used alone or in combination of two or more kinds.

The polyolefin resin foam described above is obtained as follows: a blowing agent by thermal decomposition such as azodicarbonamide or the like is added to a thermoplastic elastomer resin, a polypropylene resin and a polyethylene resin, and the mixture is uniformly mixed using a mixing device such as a Henschel mixer, a tumbler or the like, then uniformly melt-kneaded in a melt-kneading machine such as an extruder, a pressure kneader or the like at a temperature lower than the decomposition temperature of the blowing agent by thermal decomposition, and the resulting mixture is formed into a sheet shape with a T-die, and then cross-linked by the irradiation of an ionizing radiation.

Then, the obtained sheet-shaped product is heated to a temperature which is equal to or higher than the decomposition temperature of the blowing agent by thermal decomposition by a method of floating the obtained sheet-shaped product on a salt-bath serving as a heat medium or a method of placing the obtained sheet-shaped product into an atmosphere such as hot air or the like, and then the obtained sheet-shaped product is foamed due to the gas generated by the decomposition. A polyolefin resin foam of the present invention can be thus obtained.

The polyolefin resin foam produced in this way often has a skin surface on both the top and bottom surfaces usually in the ZD direction, and therefore, the surface hardness and the bending stress is higher on the skin surface than the inside portion of the foam, resulting in possible decrease in the conformability to the substrate and the flexibility. In order to solve this, one or both of the top and bottom skin surfaces in the ZD direction are preferably removed and then heated on the surfaces to obtain an adjusted skin surface. Thus, a polyolefin resin foam with a stable quality can be obtained.

The skin surface is a high-density layer which may be generated on the top surface and/or bottom surface when a polyolefin resin foam is produced, and has unfoamed cells or an extremely low foaming ratio. For this reason, the presence of the skin surface affects the stability of conformability to the substrate and flexibility, and the influence on the variation in the quality of the product may not be negligible.

The step of slicing the above-described polyolefin resin foam in a plane which is parallel to the MD-TD plane to produce a polyolefin resin foam sheet is now explained.

The device for slicing the polyolefin resin foam may be any device capable of slicing industrial soft materials and rubber sheets. For example, "NP-120RS" manufactured by NIPPY KIKAI CO., LTD. can be used. Further, any polishing machines for a foam which are generally used may be used, such as a belt sander polishing machine, a router polishing machine, CMP (chemical mechanical polishing) in which chemical actions are combined with mechanical polishing, and the like.

One example of a method of removing skin surfaces from the polyolefin resin foam is as follows: a foam sheet is prepared which is slightly thicker than the thickness set for each application, and the top and bottom skin surfaces sandwiching the polyolefin resin foam in the ZD direction are sliced or polished in the MD direction and thus removed. As a result, a polyolefin resin foam sheet without a skin surface, which comprises a sliced surface and a polished surface on which a cellular film has been broken can be obtained.

The polyolefin resin foam produced by the above-described suitable method easily generates a difference in front and back surfaces by the slicing, and a difference in surface roughness Sa is easily set to 20 μm or more and 75 μm or less.

In the present invention, a heat treatment can be preferably applied to the surface to control the surface roughness. The step of heating the foam sheet subjected to above-described slicing will now be described.

When the foam is sliced, the cellular cross section is exposed, which may lower the surface smoothness and the like. In the present invention, it is preferred that the sliced surface is thermally treated to produce an adjusted skin surface. The heating method is not particularly limited as long as it is a known method such as a heater, hot air, or the like. Moreover, the foam may be stretched in the MD direction upon heating. In order for the sliced cell wall to melt or soften and for the melted or softened surface to become smoother, the foam sheet that has undergone the slicing step is preferably heated at 150° C. to 180° C., and stretched to 105% or more and 120% or less in the MD direction. Heating and stretching in the MD direction to 105% or more and 120% or less is a suitable means for controlling the average cell size in the MD direction to 100 μm or more and 550 μm. Stretching to 110% or more and 115% or less in the MD direction is more preferred.

"When heated" means that heating and stretching may be simultaneous, sequential, or combined, and there is no particular limitation. If the sliced surface does not melt when heated, there is no pseudo skin surface, and fragments of the cell wall remain, which worsens the appearance. When the stretching is 105% or less, the foam cannot be made thin.

When the stretching ratio is 120% or more, the control of the cell shape is difficult, and irregularities in thickness are present in the MD direction or the TD direction, which may result in abnormality when the adhesive is applied. In the case of heating and stretching as described above, a foam can be obtained by any method of stretching in the MD direction or in the TD direction, and simultaneous stretching in the MD direction and the TD direction.

In the polyolefin resin foam sheet of the present invention, the polyolefin resin foam sheet subjected to the above-described slicing or subjected to heating and stretching treatments as necessary may be compressed in the ZD direction if necessary. The polyolefin resin foam sheet can be compressed and thus made thinner. The compression of the polyolefin resin foam sheet may be performed prior to heating or after heating or simultaneously with heating. Any conventionally known method of compression may be used, such as a method of sandwiching the foam sheet with driven rolls, a method of sandwiching the foam sheet with press plates, or the like.

When the resin composition having the above-described composition is used, it is possible to easily form a specific surface portion by a thermal stretching treatment and to obtain a foam exhibiting appropriate flexibility and surface hardness. In addition, by melting the surface of the foam, it is possible to control the cell state, surface condition and exposed cell wall on the outer surface of the surface portion. Furthermore, by a thermal compression treatment, the polyolefin resin foam sheet can be further made thinner with flattened cells, and the force of resilience under a load can be also reduced.

The adjusted skin surface is thinner than the skin surface which may be generated during the production of a polyolefin foam, and cells in the thickness direction can be flattened by stretching, compression, or the like. As a result, the surface smoothness can be obtained without any decrease in the conformability to the substrate and flexibility.

EXAMPLES

The evaluation methods used in the following Examples and Comparative Examples are as follows.
(1) Measurement of Melting Point:

The melting point is the maximum temperature obtained from the endothermic peak of the DSC curve in which the melting heat capacity (J/g) is taken along the vertical axis and the temperature is taken along the horizontal axis after the differential scanning calorimetric analysis. Two milligrams of a sample was prepared and measured in a nitrogen environment using a differential scanning calorimeter (DSC: RDC220-robot DSC manufactured by Seiko Instruments & Electronics Ltd.). The measurement conditions are as follows: the sample was heated to a temperature of 200° C. and melted; the exothermic peak obtained when the sample was then cooled at a rate of 10° C./min to a temperature of −100° C. corresponds to the temperature of crystallization; the sample was further cooled, and the middle point of the step transition points corresponds to the glass transition temperature. Then, the sample was heated at a rate of 10° C./min to measure an endothermic peak per unit mass. The summit of the endothermic peak due to melting obtained at the second temperature rise was taken as the melting point.
(2) MFR:

For the MFR, according to Annex B (reference) "Specified Standards and Test Conditions of Thermoplastic Materials" in JIS K 7210 (1999) "Plastics—Testing Methods of Melt Mass Flow Rate (MFR) and Melt Volume Flow Rate (MVR) of Thermoplastics," under the conditions of a temperature of 190° C. with a load of 2.16 kgf for the polyethylene resin (a2) and of a temperature of 230° C. with a load of 2.16 kgf for the polypropylene resin (a1) and the thermoplastic elastomer resin (a3), a melt mass flow rate meter (Melt Indexer F-B01 manufactured by Toyo Seiki Seisaku-sho, Ltd.) was used and a manual cutting method was applied to measure the weight of the resin exited from the die in 10 minutes.
(3) Density of Polyolefin Resin Foam:

The density of a polyolefin resin was measured according to JIS K7112 (1999) "Plastics—Methods of Determining the Density and Relative Density of Non-cellular Plastics".
(4) Measurement of Endothermic Peaks:

In the present invention, an endothermic peak of a polyolefin resin foam refers to the peak obtained on the endothermic side of the DSC curve in which the melting heat capacity (J/g) is taken along the vertical axis and the temperature is taken along the horizontal axis after the differential scanning calorimetric analysis. Specifically, after the foam cells were crushed in advance with a mixing roll or the like, 2 mg of a test piece was weighed and measured in a nitrogen environment using a differential scanning calorimeter (DSC: RDC220-robot DSC manufactured by Seiko Instruments & Electronics Ltd.). The measurement conditions were as follows: the sample was heated to a temperature of 200° C., melted, then cooled at a rate of 10° C./min to a temperature of −50° C., and then heated again at a rate of 10° C./min to obtain a DSC curve. The peak on the endothermic side determined from the DSC curve obtained at the second temperature rise is referred to as an endothermic peak.
(5) Measurement Method of Surface Roughness Sa (Arithmetic Mean Height):

As for the surface roughness, three random sites of the surface were photographed with a VHX-600 manufactured by Keyence Corporation in accordance with three-dimensional surface property parameters: ISO 25178, and the average value was taken as the arithmetic mean height Sa.
Measurement area: 9 mm$^2$ or more
Shooting interval (in the height direction): 20 μm
Filter: Gaussian was used.
(6) Measurement Method of Average Cell Size:

The cross section of the prepared polyolefin resin foam sheet was observed at a magnification of 50 times using a scanning electron microscope (SEM) (manufactured by Hitachi High-Technologies Corporation, S-3000N), and the obtained images and measurement software were used to measure the cell size (diameter). The cell size was measured in each of the longitudinal direction (MD) and the width direction (TD) within the range of 1.5 mm×1.5 mm of the photographed image, and the average cell size in each direction was calculated. The measurement was performed in ten fields and an arithmetic mean was obtained.

The average cell size on the surface A and the average cell size on the surface B were determined from cells present within the range of 10 μm from each surface.
(7) Gel Fraction of Foam:

The foam is cut into a square of about 0.5 mm, and the approximate amount of 100 mg is weighed with an accuracy to the nearest 0.1 mg. After the immersion in 200 ml of tetralin at a temperature of 140° C. for 3 hours, the solution was naturally filtered with a 100-mesh stainless steel wire mesh, and the insoluble substance on the wire mesh is dried in a hot air oven at 120° C. for 1 hour. Then, the resulting substance is cooled for 30 minutes in a desiccator containing silica gel, and the mass of this insoluble substance is accurately weighed, and the gel fraction of the foam is calculated in percentage according to the following formula.

Gel fraction (%)={Mass of insoluble substance (mg)/ Mass of foam weighed (mg)}×100.

(8) Apparent Density of Foam:

The apparent density of the polyolefin resin foam corresponds to a value measured and calculated according to JIS K 6767 (1999) "Cellular plastics—Polyethylene—Methods of test". The thickness of the foam cut into a 10 cm$^2$ is measured and the mass of this test piece is also weighed. The apparent density is the value obtained by the following formula, in which the unit is kg/m$^3$.

Apparent density (kg/m$^3$)={Mass of the test piece (kg)/Area of the test piece 0.01 (m$^2$)×Thickness of the test piece (m)}.

(9) Thickness of Foam:

The thickness of the polyolefin resin foam was measured in accordance with ISO 1923 (1981) "Cellular plastics and rubbers—Determination of linear dimensions". Specifically, using a dial gauge with a circular probe having an area of 10 cm$^2$, a piece of the foam cut into a certain size is placed still on a flat table, and a constant pressure of 10 g is applied from the top on the surface of the foam for the measurement.

(Evaluation Method)

The evaluation methods used in Examples and Comparative Examples are as follows.

(1) Waterproof Property

A double-sided tape (acrylic double-sided tape, manufactured by EBISU-CHEMICAL CO., LTD.) was attached to a foam, and punched into a U-shape (foam width of 10 mm, and overall length of 300 mm) to prepare a test piece. Then, the test piece was placed so that the open end (opened upper part in the U-shape) of the test piece would face upwards, and the test piece was sandwiched between two acrylic plates having a thickness of 10 mm in the thickness direction so that the adhesive layers of the double-sided tape would contact the acrylic plates. The test piece was then pressed in the thickness direction of the test piece so that the test piece would be compressed to 50% in thickness. Water was poured inside the U-shape of the test piece so that the water level from the inner bottom end of the test piece would be 100 mm. Then, 24 hours and 48 hours later, the presence or absence of water leakage was confirmed and evaluated as follows.

◎: Water leakage was not confirmed for 48 hours.
○: Water leakage was not confirmed for 24 hours.
×: Water leakage was confirmed in less than 24 hours.

(2) Cushioning Property

The foams were laminated on an iron plate to a thickness of 5 mm. After that, the upper portion of the foams was pressed with a finger and thus the cushioning property was evaluated.

○: The finger sinks and sufficient resilience is present.
Δ: The finger sinks insufficiently, or no resilience is present.
×: Hardness is present.

(3) Adhesive Strength Difference

The foam was punched to obtain a test piece having a width of 5 mm and a size of 150 mm in the MD direction× 150 mm in the TD direction. A polyester adhesive (trade name: Hi-Bon YA790) manufactured by Hitachi Chemical Co., Ltd. was applied on both surfaces of the foam, and then a SUS flat plate of 3 mm in thickness and 200 mm in length×200 mm in width was attached to both the front and back surfaces of the foam and then peeled off by hand and evaluated.

◎: The adhesive strength is strong, and the difference in strength between the surface A and the surface B was firmly observed.
○: A difference in strength between the surface A and the surface B was firmly observed.
Δ: A difference in strength was observed between the surface A and the surface B.
×: No difference in strength was observed between the surface A and the surface B.

(4) Adhesive Processability

When the above-described polyester adhesive was applied to the surfaces of the foam, the surfaces were observed.

○: An adhesive layer is sufficiently maintained on the surface.
Δ: An adhesive layer is formed on the surface, but the layer is thin. However, if the application amount is increased, the layer is maintained.
×: The formation of an adhesive layer is insufficient.

(5) Heat Resistance

Four sides of a 15 cm square foam were clamped and held for 30 seconds in a molding machine at 200° C., and evaluated for the properties on the surface.

○: There is no problem in the properties on the surface and the surface has good appearance.
Δ: Unevenness is slightly observed on the surface.
×: The surface becomes rough and the unevenness gets severe.

(6) Comprehensive Evaluation

The comprehensive evaluation was conducted based on the results of the waterproof property, cushioning property, adhesive strength difference, adhesive processability and heat resistance.

◎: The number of ◎ is one or more, and neither × nor Δ is observed.
○: There is no ×, and the number of Δ is one.
Δ: There is no ×, and the number of Δ is two.
×: The number of Δ is three or more, and the number of × is one or more.

The resins used in Examples and Comparative Examples are as follows.

<Thermoplastic Elastomer Resin> a-1: "Tafmer" (registered trademark) PN-3560 manufactured by Mitsui Chemicals, Inc.
Density of 866 kg/m$^3$, MFR (230° C.)=6.0 g/10 min, melting point=160° C.
Crystal melting energy=17 J/g, crystallization temperature=107° C.

a-2: "Prime TPO" (registered trademark) M142E, manufactured by Prime Polymer Co., Ltd.
Density of 900 kg/m$^3$, MFR (230° C.)=10.0 g/10 min, melting point=153° C.
Crystal melting energy=28 J/g, crystallization temperature=121° C.

a-3: JSR "JSR RB" (registered trademark) RB-840
Density of 914 kg/m$^3$, MFR (230° C.)=9.0 g/10 min, melting point=126° C.
Crystal melting energy=14 J/g, crystallization temperature=90° C.

a-4: "Tafmer" (registered trademark) PN-2070 manufactured by Mitsui Chemicals, Inc.
Density of 867 kg/m$^3$, MFR (230° C.)=7.0 g/10 min, melting point=140° C.
Crystal melting energy=14 J/g, crystallization temperature=62° C.

<Polypropylene Resin> b-1: "Novatec" (registered trademark) PP EG6D manufactured by Japan Polypropylene Corporation
Density of 900 kg/m$^3$, MFR (230° C.)=0.8 g/10 min, melting point=141° C.
b-2: "Prime Polypro" (registered trademark) J452HAP, Prime Polymer Co., Ltd.
Density of 900 kg/m3, MFR (230° C.)=3.5 g/10 min, melting point=163° C.
<Polyethylene Resin>
"Novatec" (registered trademark) LL UJ960 manufactured by Japan Polyethylene Corporation
Density of 935 kg/m$^3$, MFR (190° C.)=5 g/10 min, melting point=126° C.
EVA: "Ultrasen" (registered trademark) 636 by Tosoh Corporation <ethylene vinyl acetate copolymer resin>
Density of 941 kg/m$^3$, MFR (190° C.)=2.5 g/10 min, melting point=82° C.
Blowing agent: azodicarbonamide "Vinyfor AC#R" (registered trademark) manufactured by EIWA CHEMICAL IND. CO., LTD.
Cross-linking auxiliary agent: 55% divinylbenzene manufactured by Wako Pure Chemical Industries, Ltd
Antioxidant: "IRGANOX" (registered trademark) 1010 manufactured by BASF
(Processing Methods)

The processing methods used in Examples and Comparative Examples are as follows:

(1) Slicing Step

The slicing step is a step of cutting the foam into two or more pieces in the thickness direction, which is performed by a slicing machine.

(2) Heating Step

Heating step is a step of heating both surfaces of the foam at a temperature of 150° C. to 180° C. An infrared heater is used.

(3) Stretching Step

Stretching step is a step of stretching the foam by using different speeds between in unwinding and in winding. The foam is stretched by controlling the speed of the driving nip rolls.

(4) Compression Step

Compression step is a step of compressing and rolling the foam in the thickness direction. Compression is achieved by narrowing the gap between the nip rolls so that the gap between the nip rolls will be smaller than the thickness of the original foam.

Examples 1 to 15, Comparative Examples 1 to 13

The foams produced in Examples 1 to 15 and Comparative Examples 1 to 13 are as follows.

The thermoplastic elastomer resin, the polypropylene resin, the polyethylene resin, the blowing agent, the cross-linking auxiliary agent and the antioxidant were mixed in the respective proportions as shown in Tables 1 and 2 (% by mass is a value when the resins constituting the foam is 100% by mass, and part by mass is a value when the total amount of the resins constituting the foam is 100 parts by mass) in a Henschel mixer, and the resulting mixture was melt-extruded at a temperature of 160 to 180° C. using a twin screw extruder. Using a T-die, a polyolefin resin sheet having a thickness of ½ or more of a target foam thickness was prepared. The polyolefin resin sheet thus obtained was irradiated on one surface with an electron beam at an accelerating voltage of 700 kV and in a certain absorption dose to obtain a cross-linked sheet. This cross-linked sheet was floated on a salt-bath at a temperature of 220° C. and heated from the top with an infrared heater for foaming. The foam was cooled with water at a temperature of 50° C., and the foam surface was rinsed with water and dried. Thus, a long roll foam with skins on both surfaces, having a thickness of 1.5 mm to 3.5 mm, an apparent density of 50 to 160 kg/m$^3$, and a gel fraction of 30 to 60% was obtained. The obtained long roll foam with skins on the both surfaces was sliced in the MD direction from the first surface portion on one side of the foam with skins on the both surfaces, using a slicing machine "NP-120RS" manufactured by NIPPY KIKAI CO., LTD. to produce 3 to 5 slices having a thickness of 0.7 mm to 1.5 m (slicing step). Thus, a sliced long roll foam containing the first surface portion on one side (with a skin surface) and a sliced long roll foam not containing the first surface portion on one side (without a skin surface) were obtained. The top and bottom surfaces of the sliced long roll foams were heated at 150° C. to 180° C. by an infrared heater (heating step), and stretched to 105% to 120% in the MD direction (stretching step), and compressed in the thickness direction in a nip roll gap of 0.1 mm (compression step) to produce a foam having a thickness of 0.6 mm to 1.3 mm in which both top and bottom surfaces were heated, stretched and compressed.

TABLE 1

| | | | | Example 1 | Example 2 | Example 3 | Example 4 | Example 5 |
|---|---|---|---|---|---|---|---|---|
| Composition | Thermoplastic elastomer | Type | | a1 | a1 | a2 | a1 | a2 |
| | | Composition ratio | % by mass | 55 | 60 | 60 | 45 | 40 |
| | Polypropylene resin | Type | | b1 | b1 | b1 | b1 | b1 |
| | | Composition ratio | % by mass | 45 | 10 | 20 | 20 | 35 |
| | Polyethylene resin | Composition ratio | % by mass | | 30 | 20 | 35 | 25 |
| | EVA | Composition ratio | % by mass | | | | | |
| | Resin subtotal | | % by mass | 100 | 100 | 100 | 100 | 100 |
| | Blowing agent | Composition ratio | Parts by mass | 9 | 6 | 7 | 6 | 7 |
| | Cross-linking auxiliary agent | Composition ratio | Parts by mass | 4 | 3 | 4 | 4 | 3 |
| | Antioxidant | Composition | Parts | 1 | 1 | 1 | 1 | 1 |

TABLE 1-continued

|  |  |  |  |  |  |  |  |  |
|---|---|---|---|---|---|---|---|---|
|  |  | ratio | by mass |  |  |  |  |  |
| Properties |  | Thickness | mm | 1.3 | 0.9 | 0.8 | 0.6 | 1.3 |
|  |  | Density | kg/m³ | 70 | 130 | 110 | 145 | 115 |
|  |  | Gel fraction | % | 55 | 45 | 50 | 50 | 35 |
|  | Endothermic | First | ° C. | 140 | 123 | 122 | 124 | 123 |
|  | peaks | Second |  | 160 | 161 | 153 | 155 | 153 |
|  | MD average | Surface A | μm | 198 | 144 | 189 | 155 | 187 |
|  | cell size | Surface B |  | 245 | 174 | 253 | 190 | 229 |
|  |  | Ratio (B/A) |  | 1.24 | 1.21 | 1.34 | 1.23 | 1.22 |
|  | Surface | Surface A | μm | 24 | 29 | 29 | 18 | 33 |
|  | roughness Sa | Surface B |  | 45 | 55 | 61 | 42 | 54 |
|  |  | Sa difference |  | 21 | 26 | 32 | 24 | 21 |
| Processing method | Slicing step | Presence/Absence |  | Present | Present | Present | Present | Present |
|  | Heating step | Presence/Absence |  | Present | Present | Present | Present | Present |
|  | Stretching step | Presence/Absence |  | Present | Present | Present | Present | Present |
|  |  | Stretching ratio | % | 110 | 105 | 115 | 105 | 110 |
|  | Compression step | Presence/Absence |  | Present | Present | Present | Present | Present |
| Evaluation items |  | Waterproof property |  | ◎ | ○ | ○ | ◎ | ◎ |
|  |  | Cushioning property |  | ○ | ○ | ○ | ○ | ○ |
|  |  | Adhesive strength difference |  | ○ | ○ | ◎ | ○ | ○ |
|  |  | Adhesive processability |  | ○ | ○ | ○ | ○ | ○ |
|  |  | Heat resistance |  | ○ | ○ | ○ | ○ | ○ |
|  |  | Comprehensive evaluation |  | ◎ | ○ | ◎ | ◎ | ◎ |

|  |  |  |  | Example 6 | Example 7 | Example 8 | Example 9 | Example 10 |
|---|---|---|---|---|---|---|---|---|
| Composition | Thermoplastic elastomer | Type |  | a2 | a1 | a1 | a2 | a2 |
|  |  | Composition ratio | % by mass | 35 | 45 | 35 | 55 | 55 |
|  | Polypropylene resin | Type |  | b1 | b1 | b1 | b2 | b1 |
|  |  | Composition ratio | % by mass | 20 | 40 | 65 | 15 | 35 |
|  | Polyethylene resin | Composition ratio | % by mass | 45 | 15 |  | 30 | 10 |
|  | EVA | Composition ratio | % by mass |  |  |  |  |  |
|  | Resin subtotal |  | % by mass | 100 | 100 | 100 | 100 | 100 |
|  | Blowing agent | Composition ratio | Parts by mass | 10 | 8 | 6 | 5 | 6 |
|  | Cross-linking auxiliary agent | Composition ratio | Parts by mass | 4 | 3 | 5 | 4 | 3 |
|  | Antioxidant | Composition ratio | Parts by mass | 1 | 1 | 1 | 1 | 1 |
| Properties |  | Thickness | mm | 0.8 | 1.1 | 0.6 | 1.3 | 0.7 |
|  |  | Density | kg/m³ | 65 | 80 | 125 | 163 | 145 |
|  |  | Gel fraction | % | 50 | 35 | 55 | 50 | 40 |
|  | Endothermic | First | ° C. | 123 | 125 | 140 | 124 | 124 |
|  | peaks | Second |  | 153 | 159 | 160 | 158 | 153 |
|  | MD average | Surface A | μm | 203 | 248 | 151 | 163 | 134 |
|  | cell size | Surface B |  | 257 | 323 | 184 | 220 | 165 |
|  |  | Ratio (B/A) |  | 1.27 | 1.30 | 1.22 | 1.35 | 1.23 |
|  | Surface | Surface A | μm | 36 | 34 | 16 | 19 | 31 |
|  | roughness Sa | Surface B |  | 67 | 63 | 39 | 44 | 53 |
|  |  | Sa difference |  | 31 | 29 | 23 | 25 | 22 |
| Processing method | Slicing step | Presence/Absence |  | Present | Present | Present | Present | Present |
|  | Heating step | Presence/Absence |  | Present | Present | Present | Present | Present |
|  | Stretching step | Presence/Absence |  | Present | Present | Present | Present | Present |
|  |  | Stretching ratio | % | 115 | 115 | 110 | 110 | 105 |
|  | Compression step | Presence/Absence |  | Present | Present | Present | Present | Present |
| Evaluation items |  | Waterproof property |  | ◎ | ◎ | ○ | ◎ | ○ |
|  |  | Cushioning property |  | ○ | ○ | Δ | ○ | Δ |
|  |  | Adhesive strength difference |  | ◎ | ◎ | ○ | ◎ | ○ |
|  |  | Adhesive processability |  | ○ | ○ | ○ | ○ | ○ |
|  |  | Heat resistance |  | ○ | ○ | ○ | ○ | ○ |
|  |  | Comprehensive evaluation |  | ◎ | ◎ | ○ | ◎ | ○ |

TABLE 1-continued

| | | | Example 11 | Example 12 | Example 13 | Example 14 | Example 15 |
|---|---|---|---|---|---|---|---|
| Composition | Thermoplastic elastomer | Type | a1 | a1 | a1 | a2 | a1 |
| | | Composition ratio % by mass | 30 | 40 | 60 | 30 | 60 |
| | Polypropylene resin | Type | b1 | b2 | b2 | b2 | b1 |
| | | Composition ratio % by mass | 25 | 40 | 30 | 65 | 20 |
| | Polyethylene resin | Composition ratio % by mass | 45 | 20 | 10 | 5 | 20 |
| | EVA | Composition ratio % by mass | | | | | |
| | Resin subtotal | % by mass | 100 | 100 | 100 | 100 | 100 |
| | Blowing agent | Composition ratio Parts by mass | 6 | 10 | 6 | 8 | 5 |
| | Cross-linking auxiliary agent | Composition ratio Parts by mass | 3 | 3 | 5 | 4 | 3 |
| | Antioxidant | Composition ratio Parts by mass | 1 | 1 | 1 | 1 | 1 |
| Properties | Thickness | mm | 1.3 | 1.1 | 0.8 | 0.6 | 1.4 |
| | Density | kg/m$^3$ | 140 | 53 | 130 | 65 | 155 |
| | Gel fraction | % | 35 | 25 | 55 | 55 | 30 |
| | Endothermic peaks | First °C. | 124 | 125 | 126 | 126 | 126 |
| | | Second | 155 | 163 | 162 | 162 | 160 |
| | MD average cell size | Surface A μm | 176 | 408 | 199 | 278 | 225 |
| | | Surface B | 219 | 549 | 241 | 360 | 271 |
| | | Ratio (B/A) | 1.24 | 1.35 | 1.21 | 1.29 | 1.20 |
| | Surface roughness Sa | Surface A μm | 33 | 37 | 18 | 28 | 38 |
| | | Surface B | 71 | 78 | 41 | 48 | 59 |
| | | Sa difference | 38 | 41 | 23 | 20 | 21 |
| Processing method | Slicing step | Presence/Absence | Present | Present | Present | Present | Present |
| | Heating step | Presence/Absence | Present | Present | Present | Present | Present |
| | Stretching step | Presence/Absence | Present | Present | Present | Present | Present |
| | | Stretching ratio % | 115 | 120 | 110 | 105 | 105 |
| | Compression step | Presence/Absence | Present | Present | Present | Present | Present |
| Evaluation items | Waterproof property | | ◯ | ◯ | ◯ | ◯ | ◯ |
| | Cushioning property | | Δ | ◯ | ◯ | Δ | ◯ |
| | Adhesive strength difference | | ◯ | ◯ | Δ | Δ | ◯ |
| | Adhesive processability | | ◯ | Δ | ◯ | ◯ | Δ |
| | Heat resistance | | ◯ | Δ | ◯ | ◯ | ◯ |
| | Comprehensive evaluation | | ◯ | Δ | ◯ | Δ | ◯ |

TABLE 2

| | | | Comparative Example 1 | Comparative Example 2 | Comparative Example 3 | Comparative Example 4 | Comparative Example 5 |
|---|---|---|---|---|---|---|---|
| Composition | Thermoplastic elastomer | Type | a1 | a1 | a3 | a3 | a2 |
| | | Composition ratio % by mass | 80 | 15 | 60 | 50 | 45 |
| | Polypropylene resin | Type | b1 | b1 | b1 | b1 | b1 |
| | | Composition ratio % by mass | 20 | 70 | 40 | 30 | 45 |
| | Polyethylene resin | Composition ratio % by mass | | 20 | | 20 | 10 |
| | EVA | Composition ratio % by mass | | | | | |
| | Resin subtotal | % by mass | 100 | 105 | 100 | 100 | 100 |
| | Blowing agent | Composition ratio Parts by mass | 11 | 6 | 8 | 7 | 9 |
| | Cross-linking auxiliary agent | Composition ratio Parts by mass | 4 | 3 | 5 | 4 | 4 |
| | Antioxidant | Composition ratio Parts by mass | 1 | 1 | 1 | 1 | 1 |

TABLE 2-continued

| Properties | | | | | | | | |
|---|---|---|---|---|---|---|---|---|
| | Thickness | | mm | 0.8 | 1.2 | 1.3 | 1.2 | 1.4 |
| | Density | | kg/m³ | 90 | 130 | 75 | 110 | 70 |
| | Gel fraction | | % | 50 | 35 | 55 | 40 | 45 |
| Endothermic peaks | First | | ° C. | 141 | 124 | 124 | 125 | 125 |
| | Second | | | 161 | 156 | 140 | 140 | 153 |
| MD average cell size | Surface A | | μm | 228 | 167 | 201 | 191 | 223 |
| | Surface B | | | 298 | 190 | 223 | 209 | 251 |
| | Ratio (B/A) | | | 1.31 | 1.14 | 1.11 | 1.09 | 1.13 |
| Surface roughness Sa | Surface A | | μm | 39 | 41 | 28 | 48 | 39 |
| | Surface B | | | 52 | 59 | 45 | 51 | 71 |
| | Sa difference | | | 13 | 18 | 17 | 3 | 32 |
| Processing method | Slicing step | Presence/Absence | | Present | Present | Present | Absent | Present |
| | Heating step | Presence/Absence | | Present | Present | Present | Present | Absent |
| | Stretching step | Presence/Absence | | Present | Present | Present | Present | Absent |
| | | Stretching ratio | % | 110 | 105 | 110 | 105 | — |
| | Compression step | Presence/Absence | | Present | Absent | Present | Absent | Present |
| Evaluation items | Waterproof property | | | ○ | X | ○ | X | X |
| | Cushioning property | | | ○ | X | ○ | Δ | Δ |
| | Adhesive strength difference | | | Δ | X | Δ | X | X |
| | Adhesive processability | | | Δ | ○ | Δ | ○ | Δ |
| | Heat resistance | | | ○ | ○ | X | ○ | ○ |
| | Comprehensive evaluation | | | Δ | X | X | X | X |

| | | | | Comparative Example 6 | Comparative Example 7 | Comparative Example 8 | Comparative Example 9 |
|---|---|---|---|---|---|---|---|
| Composition | Thermoplastic elastomer | Type | | — | — | a3 | |
| | | Composition ratio | % by mass | | | 45 | |
| | Polypropylene resin | Type | | b1 | | b2 | b2 |
| | | Composition ratio | % by mass | 60 | | 50 | 70 |
| | Polyethylene resin | Composition ratio | % by mass | 40 | | 5 | 30 |
| | EVA | Composition ratio | % by mass | | 100 | | |
| | Resin subtotal | | % by mass | 100 | 100 | 100 | 100 |
| | Blowing agent | Composition ratio | Parts by mass | 7 | 6 | 5 | 5 |
| | Cross-linking auxiliary agent | Composition ratio | Parts by mass | 3 | — | 3 | 5 |
| | Antioxidant | Composition ratio | Parts by mass | 1 | 1 | 1 | 1 |
| Properties | Thickness | | mm | 0.8 | 0.8 | 1 | 1.2 |
| | Density | | kg/m³ | 115 | 125 | 155 | 180 |
| | Gel fraction | | % | 35 | 40 | 34 | 65 |
| Endothermic peaks | First | | ° C. | 125 | 82 | 127 | 126 |
| | Second | | | 141 | — | 161 | 163 |
| MD average cell size | Surface A | | μm | 178 | 155 | 113 | 82 |
| | Surface B | | | 224 | 174 | 170 | 93 |
| | Ratio (B/A) | | | 1.26 | 1.12 | 1.50 | 1.13 |
| Surface roughness Sa | Surface A | | μm | 29 | 25 | 31 | 4 |
| | Surface B | | | 41 | 39 | 45 | 9 |
| | Sa difference | | | 12 | 14 | 14 | 5 |
| Processing method | Slicing step | Presence/Absence | | Present | Present | Present | Present |
| | Heating step | Presence/Absence | | Present | Present | Present | Present |
| | Stretching step | Presence/Absence | | Present | Present | Present | Absent |
| | | Stretching ratio | % | 110 | 120 | 105 | — |
| | Compression step | Presence/Absence | | Present | Present | Present | Present |
| Evaluation items | Waterproof property | | | X | ○ | ○ | X |
| | Cushioning property | | | X | ○ | Δ | X |
| | Adhesive strength difference | | | X | X | X | X |
| | Adhesive processability | | | ○ | X | Δ | ○ |
| | Heat resistance | | | ○ | X | Δ | ○ |
| | Comprehensive evaluation | | | X | X | X | X |

Comparative Comparative Comparative Comparative

TABLE 2-continued

| | | | | Example 10 | Example 11 | Example 12 | Example 13 |
|---|---|---|---|---|---|---|---|
| Composition | Thermoplastic elastomer | Type | | a1 | a3 | a4 | a4 |
| | | Composition ratio | % by mass | 25 | 15 | 35 | 60 |
| | Polypropylene resin | Type | | b1 | b1 | b1 | b2 |
| | | Composition ratio | % by mass | 75 | 65 | 65 | 20 |
| | Polyethylene resin | Composition ratio | % by mass | | | 20 | |
| | EVA | Composition ratio | % by mass | | | | 20 |
| | | Resin subtotal | % by mass | 100 | 100 | 100 | 100 |
| | Blowing agent | Composition ratio | Parts by mass | 7 | 10 | 5 | 8 |
| | Cross-linking auxiliary agent | Composition ratio | Parts by mass | 5 | 2 | 2 | 3 |
| | Antioxidant | Composition ratio | Parts by mass | 1 | 1 | 1 | 1 |
| Properties | | Thickness | mm | 0.7 | 1.5 | 0.7 | 1.3 |
| | | Density | kg/m³ | 110 | 45 | 185 | 140 |
| | | Gel fraction | % | 62 | 15 | 55 | 45 |
| | Endothermic peaks | First | ° C. | 140 | 125 | 140 | 125 |
| | | Second | | 160 | 140 | 141 | 162 |
| | MD average cell size | Surface A | μm | 198 | 551 | 156 | 241 |
| | | Surface B | | 201 | 573 | 230 | 289 |
| | | Ratio (B/A) | | 1.02 | 1.04 | 1.47 | 1.20 |
| | Surface roughness Sa | Surface A | μm | 31 | 23 | 18 | 34 |
| | | Surface B | | 35 | 81 | 25 | 48 |
| | | Sa difference | | 4 | 58 | 7 | 14 |
| Processing method | Slicing step | Presence/Absence | | Absent | Present | Present | Present |
| | Heating step | Presence/Absence | | Absent | Absent | Present | Present |
| | Stretching step | Presence/Absence | | Absent | Present | Present | Present |
| | | Stretching ratio | % | — | 130 | 105 | 105 |
| | Compression step | Presence/Absence | | Present | Absent | Present | Absent |
| Evaluation items | | Waterproof property | | X | X | X | ○ |
| | | Cushioning property | | Δ | Δ | Δ | ○ |
| | | Adhesive strength difference | | X | ○ | Δ | Δ |
| | | Adhesive processability | | ○ | X | ○ | Δ |
| | | Heat resistance | | Δ | Δ | Δ | Δ |
| | | Comprehensive evaluation | | X | X | X | X |

INDUSTRIAL APPLICABILITY

The present invention is waterproof and is excellent in flexibility, cushioning, and heat resistance, and thus can be suitably used widely in the fields of architecture, electricity, electronics, vehicles, and the like, particularly as a substrate for a sealing material.

The invention claimed is:

1. A polyolefin resin foam sheet having front and back surfaces which is made of a polyolefin resin foam comprising a polyolefin resin and a thermoplastic elastomer resin, wherein the polyolefin resin foam sheet endothermic peaks measured by a differential scanning calorimeter (DSC) occur in a range of at least 120° C. or more and 143° C. or less and at 153° C. or more and 170° C. or less, said thermoplastic elastomer resin is contained at a ratio of 40% by mass or more and 60% by mass or less based on 100% by mass of the resins constituting the polyolefin resin foam sheet, said polyolefin resin is contained at a ratio of 60% by mass or less and 40% by mass or more based on 100% by mass of the resins constituting the polyolefin resin foam sheet, together the thermoplastic elastomer resin and the polyolefin resin constitute 100% by mass of the resins constituting the polyolefin resin foam sheet, a surface roughness Sa (arithmetic mean height) of both the front and the back surfaces is 16 μm or more and 80 μm or less, and a difference in surface roughness Sa between the front and the back surfaces is 20 μm or more and less than 50 μm based on the following formula:

(Difference in surface roughness $Sa$ between the front and the back surfaces)=(Surface roughness $Sa$ on the surface $B$)−(Surface roughness $Sa$ on the surface $A$), both the surface A and the surface B are sliced and stretched, an average cell size in a machine direction (MD) corresponding to a resin extrusion direction or length direction on both the front and the back surfaces is 134 μm or more and 550 μm or less, and a ratio of the average cell size in the MD direction on the surface B to the average cell size in the MD direction on the surface A is 1.2 or more and 1.35 or less based on the following formula:

(Ratio of the average cell size in the MD direction)= (Average cell size in the MD direction on the surface B)/(Average cell size in the MD direction on the surface A).

2. The polyolefin resin foam sheet according to claim 1, wherein the gel fraction is 20% or more and 60% or less.

3. The polyolefin resin foam sheet according to claim 1, wherein the apparent density is 50 kg/m3 or more and 165 kg/m3 or less, and the thickness is 0.6 mm or more and 1.4 mm or less.

4. A method of producing said polyolefin resin foam sheet according to claim 1, comprising:
- a foaming step of foaming a resin composition comprising at least said polyolefin resin and said thermoplastic elastomer to produce a first foam sheet product; and
- a slicing step of slicing said first foam sheet product in parallel to a plane formed by the MD direction and a transverse or width direction perpendicular to the MD direction and parallel to the polyolefin resin foam sheet to produce a second foam sheet product-,
- a heating step of heating said second foam sheet product to produce a third foam sheet product; and
- a stretching step of stretching the third foam sheet product in the MD direction to 105% or more and 120% or less to produce a fourth foam sheet product.

5. The method of producing a polyolefin resin foam sheet according to claim 4, further comprising a compression step of compressing said fourth foam sheet product to produce a final foam sheet product.

6. An adhesive tape comprising the polyolefin foam sheet according to claim 1 having an adhesive layer formed on one or both surfaces thereof.

\* \* \* \* \*